(12) United States Patent
Fan et al.

(10) Patent No.: US 10,274,788 B2
(45) Date of Patent: Apr. 30, 2019

(54) DISPLAY SUBSTRATE, METHOD FOR MANUFACTURING THE SAME AND LIQUID CRYSTAL DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yuguang Fan, Beijing (CN); Jingpeng Li, Beijing (CN); Jian Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/539,634

(22) PCT Filed: May 20, 2016

(86) PCT No.: PCT/CN2016/082807
§ 371 (c)(1),
(2) Date: Jun. 23, 2017

(87) PCT Pub. No.: WO2017/156862
PCT Pub. Date: Sep. 21, 2017

(65) Prior Publication Data
US 2018/0045995 A1    Feb. 15, 2018

(30) Foreign Application Priority Data
Mar. 17, 2016  (CN) .......................... 2016 1 0151993

(51) Int. Cl.
*G02F 1/1333*  (2006.01)
*G02F 1/1339*  (2006.01)
(Continued)

(52) U.S. Cl.
CPC .......... *G02F 1/1339* (2013.01); *G02F 1/0107* (2013.01); *G02F 1/1337* (2013.01);
(Continued)

(58) Field of Classification Search
CPC .... G02F 1/1339; G02F 1/1337; G02F 1/0107; G02F 1/133308; G02F 1/1341; G02F 2001/133388; G02F 1/133784
(Continued)

(56) References Cited

U.S. PATENT DOCUMENTS

2008/0062374 A1    3/2008  Katsumura
2011/0058135 A1*   3/2011  Misaki .................. G02F 1/1339
                                                            349/153
(Continued)

FOREIGN PATENT DOCUMENTS

CN      102012576       4/2011
CN      103412431 A     11/2013
(Continued)

OTHER PUBLICATIONS

International Search Report and Written Opinion in PCT/CN2016/082807 dated Dec. 15, 2016, with English translation.
(Continued)

*Primary Examiner* — Charles S Chang
(74) *Attorney, Agent, or Firm* — Womble Bond Dickinson (US) LLP

(57) ABSTRACT

The embodiments of the present invention provide a display substrate, a method for manufacturing the same and a liquid crystal display device. The display substrate includes a display region and a non-display region. The non-display region includes at least a sealing region surrounding the display region. The sealing region includes a segment difference padding layer, and the segment difference padding layer includes several through holes. The display substrate,
(Continued)

the method for manufacturing the same and the liquid crystal display device provided by the embodiments of the invention can eliminate the mura phenomenon, simplify the process and prevent the resin layer from being peeled off from the substrate.

18 Claims, 4 Drawing Sheets

(51) Int. Cl.
   *G02F 1/1337* (2006.01)
   *G02F 1/01* (2006.01)
   *G02F 1/1341* (2006.01)

(52) U.S. Cl.
   CPC ...... *G02F 1/1341* (2013.01); *G02F 1/133308* (2013.01); *G02F 1/133784* (2013.01); *G02F 2001/133388* (2013.01)

(58) Field of Classification Search
   USPC .......................................... 349/153
   See application file for complete search history.

(56) References Cited

U.S. PATENT DOCUMENTS

| | | | |
|---|---|---|---|
| 2011/0058137 A1 | 3/2011 | Huang et al. | |
| 2011/0222015 A1* | 9/2011 | Kang | G02F 1/133784 349/155 |
| 2012/0242946 A1* | 9/2012 | Itoh | G02F 1/1339 349/153 |
| 2015/0372014 A1 | 12/2015 | Gao | |
| 2016/0342031 A1 | 11/2016 | Xue et al. | |

FOREIGN PATENT DOCUMENTS

| | | |
|---|---|---|
| CN | 104078470 A | 10/2014 |
| CN | 104280939 A | 1/2015 |
| CN | 104330911 A | 2/2015 |
| CN | 105589261 A | 5/2016 |

OTHER PUBLICATIONS

"First office action," CN Application No. 201610151993.1 (dated May 3, 2018).

\* cited by examiner

DISPLAY SUBSTRATE, METHOD FOR MANUFACTURING THE SAME AND LIQUID CRYSTAL DISPLAY DEVICE

RELATED APPLICATIONS

The present application is the U.S. national phase entry of the international application PCT/CN2016/082807, with an international filing date of May 20, 2016, which claims the benefit of Chinese Patent Application No. 201610151993.1, filed on Mar. 17, 2016, the entire disclosures of which are incorporated herein by reference.

TECHNICAL FIELD

The present invention relates to the field of display technology, in particular to a display substrate, a method for manufacturing the same and a liquid crystal display device.

BACKGROUND

Liquid crystal display device (LCD) has become a mainstream product of the current flat panel display device because of its characteristics such as small size, low power consumption and no radiation. The liquid crystal display panel is an important element in a liquid crystal display device. A liquid crystal display panel includes an array substrate and a color film substrate disposed oppositely, and a liquid crystal layer is located between the array substrate and the color film substrate.

When the liquid crystal display panel is not energized, in order to maintain a specific orientation for the liquid crystal in the liquid crystal display panel, rubbing alignment should be performed on the surfaces of the array substrate and the color film substrate facing each other to form grooves having a certain orientation. The grooves are typically formed by rubbing with a rubbing cloth.

In the rubbing process for the alignment layer of the liquid crystal display substrate, rubbing mura is apt to occur. This is due to poor consistency of rubbing when the surface of the alignment layer is rubbed by the rubbing cloth, which leads to poor consistency of the formed grooves. The inventor also notes that mura typically occurs on a position opposite to the data line, affecting the display quality of the liquid crystal display panel seriously.

SUMMARY

Embodiments of the invention provide a display substrate, a method for manufacturing the same and a liquid crystal display device, which can eliminate the mura phenomenon, simplify the process and ensure the adhesive force in the sealing region.

The display substrate provided by the embodiment of the invention includes a display region and a non-display region. The non-display region includes at least a sealing region surrounding the display region. The sealing region includes a segment difference padding layer, and the segment difference padding layer includes several through holes.

In a display substrate, a certain segment difference may exist between the display region and the non-display region. By applying the segment difference padding layer in the sealing region, the segment difference between the non-display region and the display region of the display substrate can be eliminated, thereby eliminating the rubbing mura. The segment difference padding layer is applied only in the sealing region, the manufacturing process of the display substrate is thus simplified. Further, since the segment difference padding layer includes the through holes, the fluffs on the rubbing cloth can thus be smoothed, thereby further avoiding poor rubbing alignment caused by messy fluffs of the rubbing cloth. The through holes can be filled with a sealing material to ensure the sealing function of the sealing region.

Optionally, a material of the segment difference padding layer is resin.

Compared with a passivation layer, a resin material can be applied by a relatively simple process (e.g., but not limited to: deposition, spin coating). The resin material also has better optical and mechanical properties.

Optionally, the through holes are circular through holes.

The circular through holes can comb the fluffs on the rubbing cloth, so as to avoid poor rubbing alignment caused by messy fluffs of the rubbing cloth.

Optionally, a diameter of each circular through hole is in a range of 1-10 μm.

By applying the through holes with a certain diameter, a sealant can be filled in the through holes to ensure sufficient adhesive strength at the edge of the display substrate.

Optionally, a distribution density of the circular through holes decreases as a distance from the display region decreases.

With a gradually changed distribution density, the fluffs on the rubbing cloth can be smoothed, thereby further avoiding poor rubbing alignment caused by messy fluffs of the rubbing cloth. Meanwhile, sufficient adhesive strength at the edge of the display substrate can also be ensured.

Optionally, a cross sectional area of the through hole decreases as a distance from the display region decreases.

With gradually changed sectional areas of the through holes, in a range from the segment difference padding layer to the display region, the fluffs on the rubbing cloth can be smoothed, thereby further avoiding poor rubbing alignment caused by messy fluffs of the rubbing cloth. Meanwhile, sufficient adhesive strength at the edge of the display substrate can also be ensured.

Optionally, a total area of the several through holes is 5-50% of an area of the segment difference padding layer.

The sealant can be filled in the through holes, the total area of the several through holes thus can ensure sufficient adhesive strength between the segment difference padding layer and the substrate.

Optionally, a cross section of the through hole has a stripe shape.

By setting the cross section of the through hole as a stripe shape, the segment difference padding layer has a comb-like arrangement. The sealant can thus be filled into the intervals between the strip-like portions of the segment difference padding layer, thereby increasing the cohesive force and preventing the segment difference padding layer from being peeled off from the substrate. Moreover, such an arrangement can also comb the fluffs on the rubbing cloth, reducing the damage to the fluffs on the rubbing cloth caused by the segment difference.

Optionally, a width of the through hole is smaller than or equal to an interval between two directly adjacent strip shaped through holes.

With such an arrangement, more sealant can be filled into the intervals between the strip-like portions of the segment difference padding layer, thereby increasing the cohesive force and preventing the segment difference padding layer from being peeled off from the substrate.

Optionally, the display substrate further includes a sealant filling the through holes and covering the segment difference padding layer. Similarly, a passivation layer can also be used for covering the segment difference padding layer, a sealant can then be filled into the through holes, and the sealant covers the passivation layer.

With the sealant, a cell aligning process can be performed. The sealant is also permeable to the through hole, increasing the adhesive strength between the segment difference padding layer and the substrate.

Optionally, several recesses are formed on the surface of the segment difference padding layer.

The recesses formed on the surface of the segment difference padding layer can also be filled with the sealant, thereby increasing the adhesive strength between the segment difference padding layer and the substrate.

An embodiment of the invention further provides a method for manufacturing a display substrate. The method includes the following steps: forming a segment difference padding layer in a sealing region surrounding a display region of the display substrate, and forming several through holes in the segment difference padding layer.

In a display substrate, a certain segment difference may exist between the display region and the non-display region. By applying the segment difference padding layer in the sealing region, the segment difference between the non-display region and the display region of the display substrate can be eliminated, thereby eliminating the rubbing mura. The segment difference padding layer is applied only in the sealing region, the manufacturing process of the display substrate is thus simplified. Further, since the segment difference padding layer includes the through holes, the fluffs on the rubbing cloth can thus be smoothed, thereby further avoiding poor rubbing alignment caused by messy fluffs of the rubbing cloth. The through holes can be filled with a sealing material to ensure the sealing function of the sealing region.

Optionally, the method further includes: performing a rubbing alignment process on the display substrate.

A rubbing alignment process using a rubbing cloth can be performed to the display substrate to form an alignment layer, thereby determining an initial orientation of the liquid crystal molecules.

Optionally, the method further includes: after performing a rubbing alignment process on the display substrate, filling the through holes and covering the segment difference padding layer with a sealant.

With the sealant, a cell aligning process can be performed. The sealant is also permeable to the through hole, increasing the adhesive strength between the segment difference padding layer and the substrate.

An embodiment of the present invention also provides a liquid crystal display device. The liquid crystal display device includes the display substrate in the above mentioned embodiments.

BRIEF DESCRIPTION OF THE DRAWINGS

In order to more clearly illustrate the technical solutions in embodiments of the invention or in the prior art, the appended drawings needed to be used in the description of the embodiments or the prior art will be introduced briefly in the following. Obviously, the drawings in the following description are only some embodiments of the invention, and for those of ordinary skills in the art, other drawings may be obtained according to these drawings under the premise of not paying out creative work.

DETAILED DESCRIPTION OF THE INVENTION

In the following, the technical solutions in the embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

Figure 1:
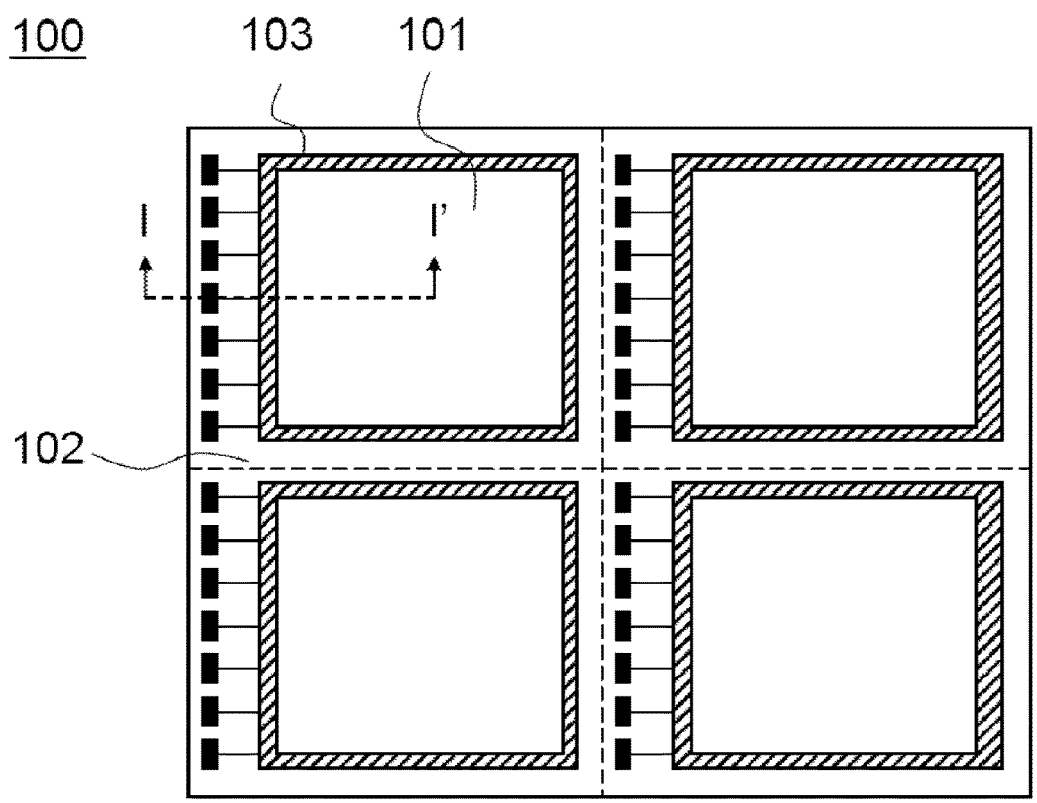
FIG. 1 is a schematic diagram of a display substrate according to an embodiment of the invention.
Figure 2:
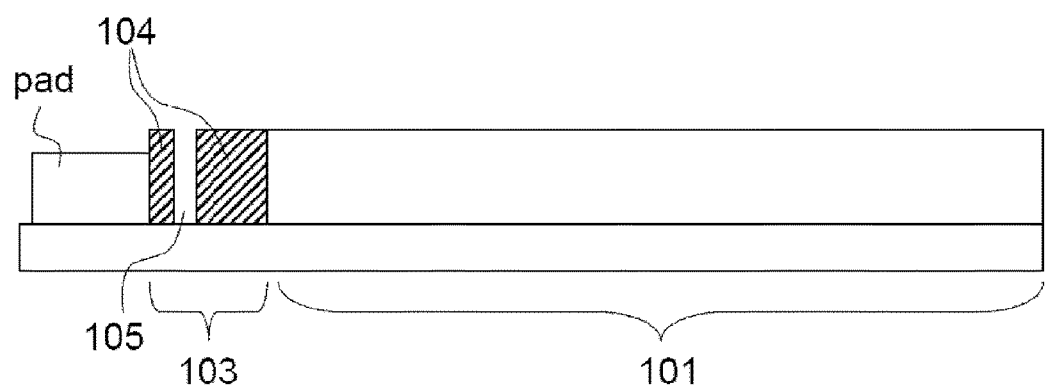
FIG. 2 is a cross section view of a display substrate along the I-I' line in FIG. 1 according to an embodiment of the invention.

As shown in FIG. 1 and FIG. 2, the display substrate 100 provided by the embodiment of the invention includes a display region 101 and a non-display region 102. The non-display region 102 includes at least a sealing region 103 surrounding the display region 101. The sealing region 103 includes a segment difference padding layer 104, and the segment difference padding layer 104 includes several through holes 105.

Typically, the non-display region of the display substrate can also include a pad region and/or a wiring region as indicated by "pad" in FIG. 2. In a display substrate, a certain segment difference may exist between the display region and the non-display region. By applying the segment difference padding layer in the sealing region, the segment difference between the non-display region and the display region of the display substrate can be eliminated, thereby eliminating the rubbing mura. The segment difference padding layer is applied only in the sealing region, the manufacturing process of the display substrate is thus simplified. Further, since the segment difference padding layer includes the through holes, the fluffs on the rubbing cloth can thus be smoothed, thereby further avoiding poor rubbing alignment caused by messy fluffs of the rubbing cloth. The through holes can be filled with a sealing material to ensure the sealing function of the sealing region.

In the context of the present invention, the term "display substrate" can refer to a monolithic substrate with a plurality of display regions prior to cutting (for example, as shown in FIG. 1, the display substrate 100 includes four individual substrates prior to cutting along the dotted lines). The term "display substrate" can also refer to a substrate having a single display region after cutting.

Optionally, a material of the segment difference padding layer 104 is resin.

Compared with a passivation layer, a resin material can be applied by a relatively simple process (e.g., but not limited to: deposition, spin coating). The resin material also has better optical and mechanical properties.

Figure 3:
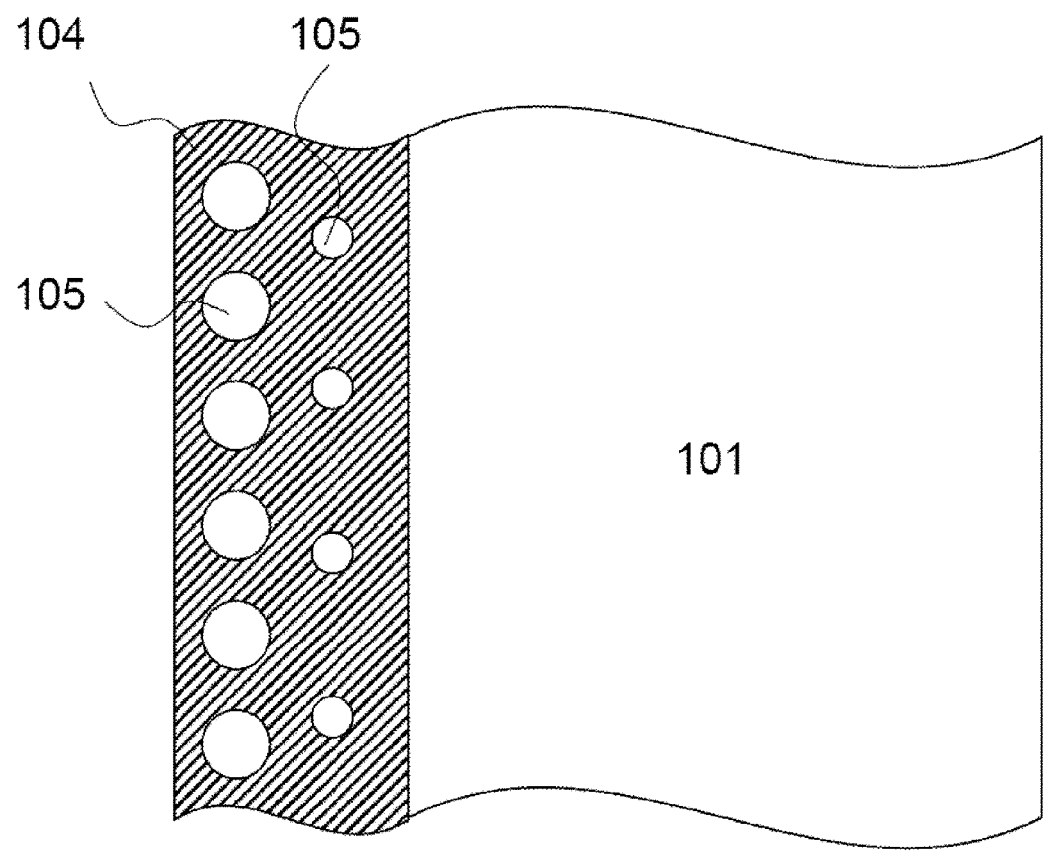
FIG. 3 is a schematic diagram showing a local region of a display substrate according to an embodiment of the invention.

Optionally, as shown in FIG. 3, the through holes 105 are circular through holes.

The circular through holes can comb the fluffs on the rubbing cloth, so as to avoid poor rubbing alignment caused by messy fluffs of the rubbing cloth.

Optionally, a diameter of each circular through hole 105 is in a range of 1-10 μm.

By applying the through holes with a certain diameter, a sealant can be filled in the through holes to ensure sufficient adhesive strength at the edge of the display substrate.

Optionally, as shown in FIG. 3, a distribution density of the circular through holes 105 decreases as a distance from the display region 101 decreases.

With a gradually changed distribution density, the fluffs on the rubbing cloth can be smoothed, thereby further avoiding poor rubbing alignment caused by messy fluffs of the rubbing cloth. Meanwhile, sufficient adhesive strength at the edge of the display substrate can also be ensured.

Optionally, as shown in FIG. 3, a cross sectional area of the through hole 105 decreases as a distance from the display region 101 decreases.

With gradually changed sectional areas of the through holes, in a range from the segment difference padding layer to the display region, the fluffs on the rubbing cloth can be smoothed, thereby further avoiding poor rubbing alignment caused by messy fluffs of the rubbing cloth. Meanwhile, sufficient adhesive strength at the edge of the display substrate can also be ensured.

Optionally, a total area of the several through holes 105 is 5-50% of an area of the segment difference padding layer 104.

The sealant can be filled in the through holes, the total area of the several through holes thus can ensure sufficient adhesive strength between the segment difference padding layer and the substrate.

Figure 4:
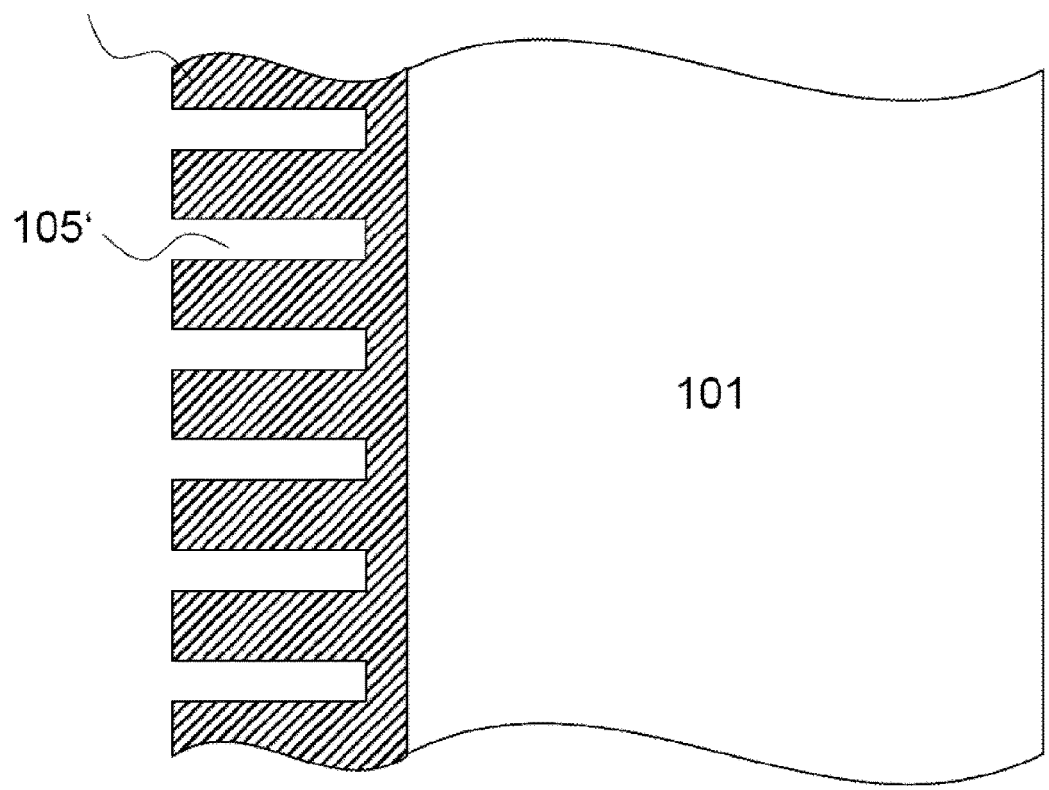
FIG. 4 is a schematic diagram showing a local region of a display substrate according to another embodiment of the invention.

Optionally, as shown in FIG. 4, a cross section of the through hole 105' has a stripe shape.

By setting the cross section of the through hole as a stripe shape, the segment difference padding layer has a comb-like arrangement. The sealant can thus be filled into the intervals between the strip-like portions of the segment difference padding layer, thereby increasing the cohesive force and preventing the segment difference padding layer from being peeled off from the substrate. Moreover, such an arrangement can also comb the fluffs on the rubbing cloth, reducing the damage to the fluffs on the rubbing cloth caused by the segment difference.

Optionally, a width of the through hole 105' is smaller than or equal to an interval between two directly adjacent strip shaped through holes.

With such an arrangement, more sealant can be filled into the intervals between the strip-like portions of the segment difference padding layer, thereby increasing the cohesive force and preventing the segment difference padding layer from being peeled off from the substrate.

Optionally, the display substrate further includes a sealant 106 filling the through holes 105 and covering the segment difference padding layer 104. Similarly, a passivation layer can also be used for covering the segment difference padding layer 104, a sealant can then be filled into the through holes 105, and the sealant covers the passivation layer.

With the sealant, a cell aligning process can be performed. The sealant is also permeable to the through hole, increasing the adhesive strength between the segment difference padding layer and the substrate.

Figure 6:
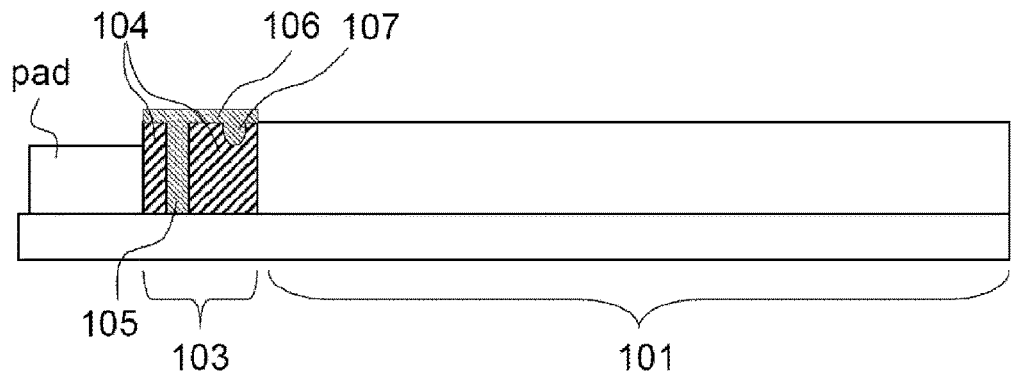
FIG. 6 is a cross section view of a display substrate according to yet another embodiment of the invention.
Figure 7:
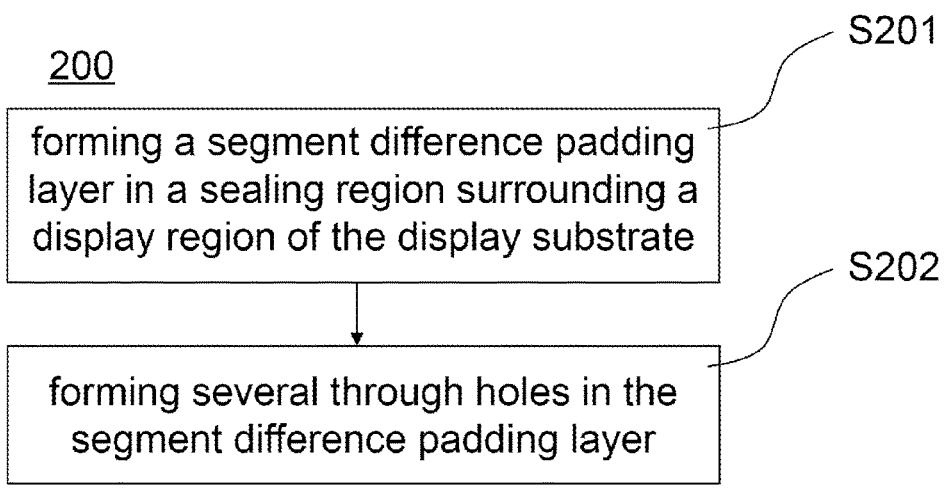
FIG. 7 is a flow chart of a method for manufacturing a display substrate according to an embodiment of the invention.

Optionally, as shown in FIG. 6, several recesses 107 are formed on the surface of the segment difference padding layer 104.

The recesses formed on the surface of the segment difference padding layer can also be filled with the sealant, thereby increasing the adhesive strength between the segment difference padding layer and the substrate.

An embodiment of the invention further provides a method for manufacturing a display substrate. As shown in FIG. 4, the method 200 includes the following steps.

S201: forming a segment difference padding layer in a sealing region surrounding a display region of the display substrate, and S202: forming several through holes in the segment difference padding layer.

In a display substrate, a certain segment difference may exist between the display region and the non-display region. By applying the segment difference padding layer in the sealing region, the segment difference between the non-display region and the display region of the display substrate can be eliminated, thereby eliminating the rubbing mura. The segment difference padding layer is applied only in the sealing region, the manufacturing process of the display substrate is thus simplified. Further, since the segment difference padding layer includes the through holes, the fluffs on the rubbing cloth can thus be smoothed, thereby further avoiding poor rubbing alignment caused by messy fluffs of the rubbing cloth. The through holes can be filled with a sealing material to ensure the sealing function of the sealing region.

Optionally, in the step of forming several through holes in the segment difference padding layer, the through holes 105 can be formed in the segment difference padding layer by applying, for example, a photolithography process.

Optionally, as shown in FIG. 3, the through holes 105 are formed as circular through holes.

The circular through holes can comb the fluffs on the rubbing cloth, so as to avoid poor rubbing alignment caused by messy fluffs of the rubbing cloth.

Optionally, as shown in FIG. 3, a diameter of each circular through hole 105 is in a range of 1-10 μm.

By applying the through holes with a certain diameter, a sealant can be filled in the through holes to ensure sufficient adhesive strength at the edge of the display substrate.

Optionally, as shown in FIG. 3, a distribution density of the circular through holes 105 decreases as a distance from the display region 101 decreases.

With a gradually changed distribution density, the damage to the fluffs on the rubbing cloth can be reduced. Meanwhile, sufficient adhesive strength at the edge of the display substrate can also be ensured.

Optionally, as shown in FIG. 3, a cross sectional area of the through hole 105 decreases as a distance from the display region 101 decreases.

With gradually changed sectional areas of the through holes, in a range from the segment difference padding layer to the display region, the fluffs on the rubbing cloth can be smoothed, thereby further avoiding poor rubbing alignment caused by messy fluffs of the rubbing cloth. Meanwhile, sufficient adhesive strength at the edge of the display substrate can also be ensured.

Optionally, a total area of the several through holes 105 is 5-50% of an area of the segment difference padding layer 104.

The sealant can be filled in the through holes, the total area of the several through holes thus can ensure sufficient adhesive strength between the segment difference padding layer and the substrate.

Optionally, as shown in FIG. 4, a cross section of the through hole 105' has a stripe shape.

By setting the cross section of the through hole as a stripe shape, the segment difference padding layer has a comb-like arrangement. The sealant can thus be filled into the intervals between the strip-like portions of the segment difference padding layer, thereby increasing the cohesive force and preventing the segment difference padding layer from being peeled off from the substrate. Moreover, such an arrangement can also comb the fluffs on the rubbing cloth, reducing the damage to the fluffs on the rubbing cloth caused by the segment difference.

Optionally, a width of the through hole 105' is smaller than or equal to an interval between two directly adjacent strip shaped through holes.

With such an arrangement, more sealant can be filled into the intervals between the strip-like portions of the segment difference padding layer, thereby increasing the cohesive force and preventing the segment difference padding layer from being peeled off from the substrate.

Optionally, the method further includes: performing a rubbing alignment process on the display substrate.

A rubbing alignment process using a rubbing cloth can be performed to the display substrate to form an alignment layer, thereby determining an initial orientation of the liquid crystal molecules.

Figure 5:
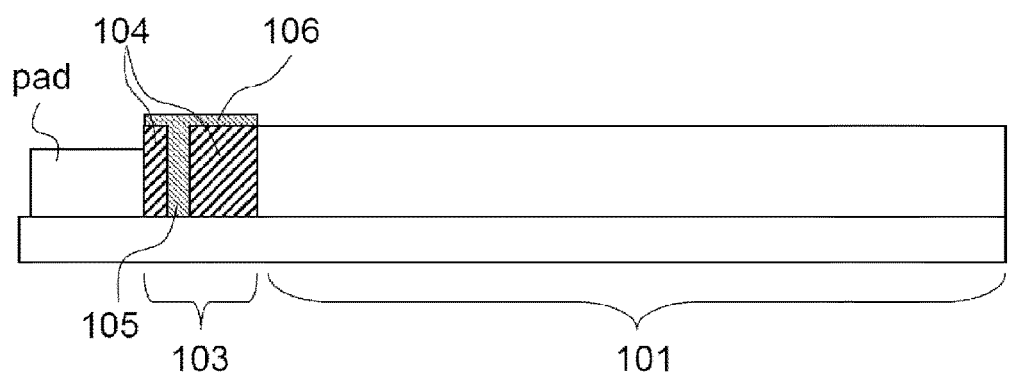
FIG. 5 is a cross section view of a display substrate according to another embodiment of the invention.

Optionally, the method further includes: after performing a rubbing alignment process on the display substrate, filling the through holes 105 and covering the segment difference padding layer 104 with a sealant 106 (as shown in FIG. 5). Similarly, a passivation layer can also be used for covering the segment difference padding layer 104, a sealant can then be filled into the through holes 105, and the sealant covers the passivation layer.

With the sealant, a cell aligning process can be performed. The sealant is also permeable to the through hole, increasing the adhesive strength between the segment difference padding layer and the substrate.

Figure 8:
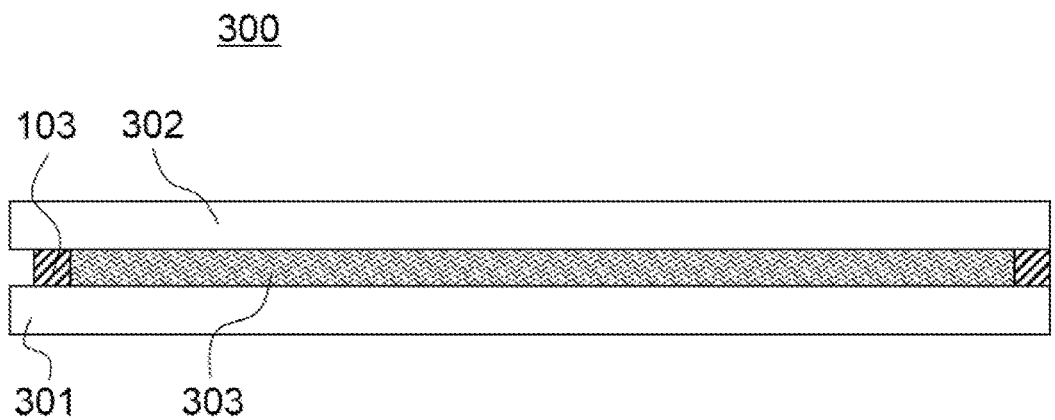
FIG. 8 is a cross section view of a liquid crystal display device according to an embodiment of the invention.

An embodiment of the present invention also provides a liquid crystal display device. The liquid crystal display device includes the display substrate in the above mentioned embodiments. As shown in FIG. 8, the liquid crystal display device 300 includes an array substrate 301 and a color film substrate 302 disposed oppositely, and a liquid crystal layer 303 is located between the array substrate 301 and the color film substrate 302. The array substrate 301 can be the display substrate according to the above mentioned embodiments of the present invention, which includes a sealing region 103 as described above.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A display substrate comprising a display region and a non-display region, the non-display region comprising at least a sealing region surrounding the display region; wherein the sealing region comprises a segment difference padding layer, and the segment difference padding layer comprises several through holes; a height of the segment difference padding layer is substantially equal to a height of the display region; and
    wherein a cross sectional area of the through hole decreases as a distance between the through hole and the display area decreases.

2. The display substrate according to claim 1, wherein a material of the segment difference padding layer is resin.

3. The display substrate according to claim 1, wherein the through holes are circular through holes.

4. The display substrate according to claim 3, wherein a diameter of each circular through hole is in a range of 1-10 μm.

5. The display substrate according to claim 3, wherein a distribution density of the circular through holes decreases as a distance from the display region decreases.

6. The display substrate according to claim 1, wherein a total area of the several through holes is 5-50% of an area of the segment difference padding layer.

7. The display substrate according to claim 1, wherein a cross section of the through hole has a stripe shape.

8. The display substrate according to claim 7, wherein a width of the through hole is smaller than or equal to an interval between two directly adjacent strip shaped through holes.

9. The display substrate according to claim 1, further comprising a sealant filling the through holes and covering the segment difference padding layer.

10. A liquid crystal display device comprising the display substrate according to claim 1.

11. The liquid crystal display device according to claim 10, wherein a material of the segment difference padding layer is resin.

12. The liquid crystal display device according to claim 10, wherein the through holes are circular through holes.

13. The liquid crystal display device according to claim 10, wherein a total area of the several through holes is 5-50% of an area of the segment difference padding layer.

14. The liquid crystal display device according to claim 10, wherein a cross section of the through hole has a stripe shape.

15. The liquid crystal display device according to claim 10, further comprising a sealant filling the through holes and covering the segment difference padding layer.

16. A method for manufacturing a display substrate, comprising:
    forming a segment difference padding layer in a sealing region surrounding a display region of the display substrate, and forming several through holes in the segment difference padding layer;
    wherein a height of the segment difference padding layer is substantially equal to a height of the display region; and
    wherein a cross sectional area of the through hole decreases as a distance between the through hole and the display area decreases.

17. The method according to claim 16, further comprising: performing a rubbing alignment process on the display substrate.

18. The method according to claim 17, further comprising: after performing a rubbing alignment process on the display substrate, filling the through holes and covering the segment difference padding layer with a sealant.

* * * * *